United States Patent [19]
Yoshino et al.

[11] Patent Number: 5,866,200
[45] Date of Patent: Feb. 2, 1999

[54] PROCESS FOR PRODUCING OPTICAL WAVEGUIDE-PROVIDED SUBSTRATE

[75] Inventors: Takashi Yoshino; Tatsuo Kawaguchi; Minoru Imaeda, all of Nagoya; Kenji Kato, Ama-gun; Takashi Oguchi, Nagoya, all of Japan

[73] Assignee: NGK Insulators Ltd., Japan

[21] Appl. No.: 825,020

[22] Filed: Mar. 26, 1997

[30] Foreign Application Priority Data

Mar. 29, 1996 [JP] Japan ................................. 8-076612

[51] Int. Cl.$^6$ ....................................................... B05D 5/06
[52] U.S. Cl. ........................ 427/163.2; 427/271; 427/287; 427/555
[58] Field of Search ................................ 427/163.2, 555, 427/271, 287

[56] References Cited

U.S. PATENT DOCUMENTS

| | | | |
|---|---|---|---|
| 3,873,339 | 3/1975 | Hudson | 350/96.31 |
| 5,106,211 | 4/1992 | Chiang et al. | 385/132 |
| 5,363,462 | 11/1994 | Hung et al. | 385/122 |
| 5,368,900 | 11/1994 | Jelley et al. | 427/555 |

FOREIGN PATENT DOCUMENTS

| | | |
|---|---|---|
| 0 585 565 | 3/1994 | European Pat. Off. . |
| 06317718 | 11/1994 | Japan . |

*Primary Examiner*—Janyce Bell
*Attorney, Agent, or Firm*—Wall Marjama Bilinski & Burr

[57] ABSTRACT

A process for producing an optical waveguide device including a substrate and a ridge-shaped optical waveguide projected at a main plane of the substrate, comprising the steps of: forming said ridge shaped optical waveguide at the main plane of the substrate by abrasion working.

10 Claims, 8 Drawing Sheets

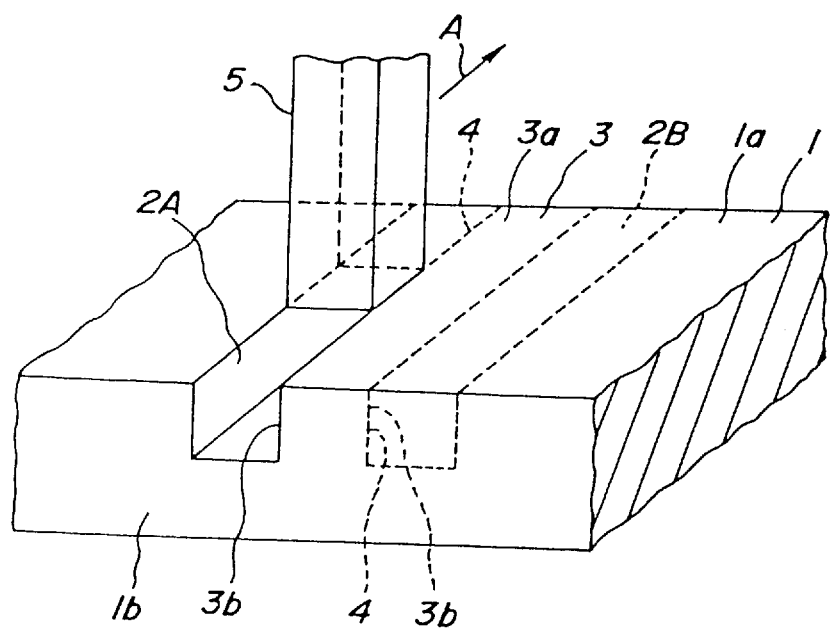
FIG_1

FIG_2
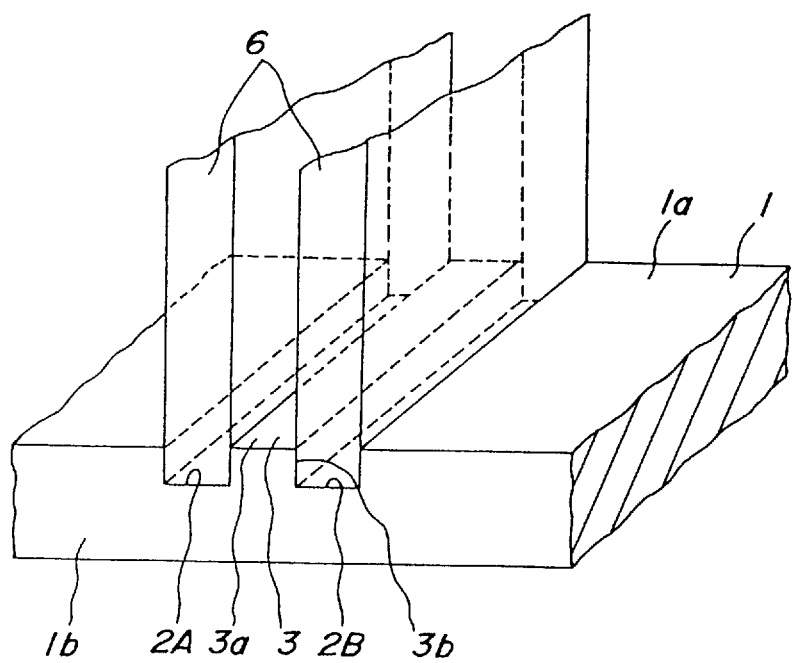

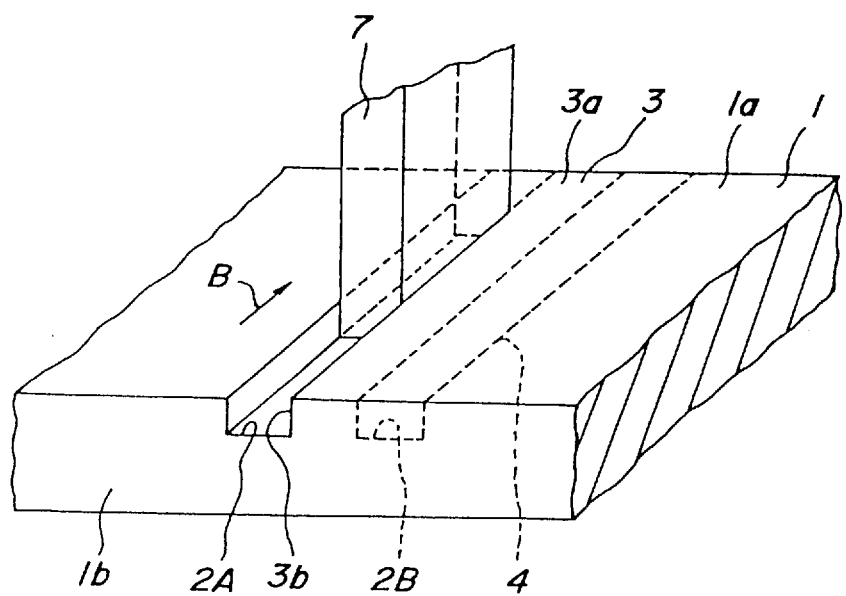
FIG_3

FIG_4a
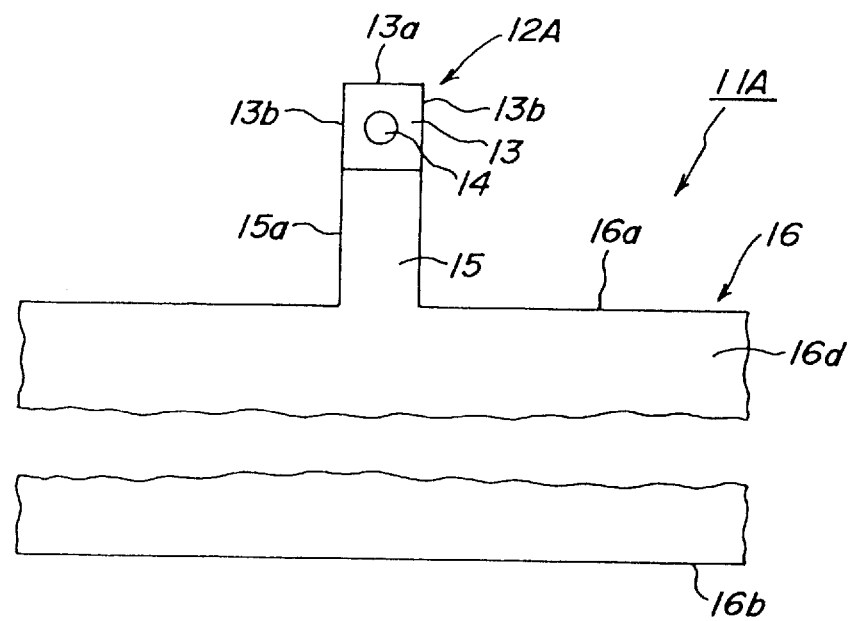
FIG_4b
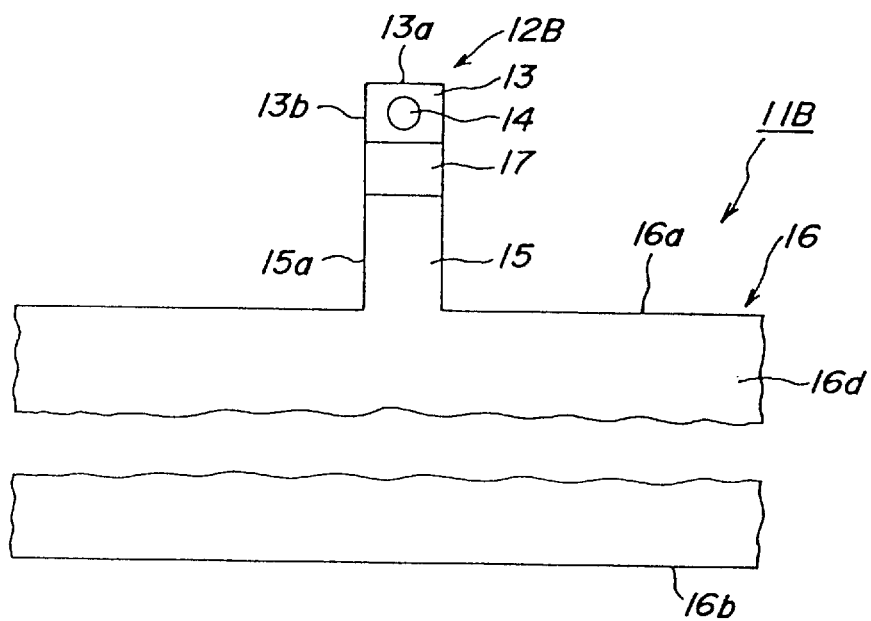

FIG_8
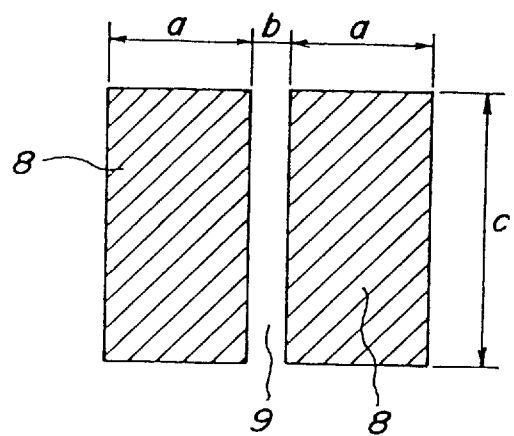

PROCESS FOR PRODUCING OPTICAL WAVEGUIDE-PROVIDED SUBSTRATE

BACKGROUND OF THE INVENTION

(1) Field of the Invention

The present invention relates to a process for producing optical waveguide provided substrates each having a ridge shaped optical waveguide portion to be favorably used as a second harmonic generation element of a quasi phase matched type and optical modulator.

(2) Related Art Statement

The so called ridge shaped optical guidewaves have been expected as optical modulators, optical switching elements, etc. Quasi-phase matched (QPM) type second harmonic generation (SHG) devices using optical waveguides in which a periodically reversibly polarized structure is formed in a single crystal made of lithium niobate or lithium tantalate have been expected as blue laser light sources to be used for light picks. The second harmonic generation devices can find wide uses such as optical disc memorization, medical uses, optochemical uses, various optical measurements, etc.

Heretofore, in order to form a ridge shaped structure, it is a common knowledge that a mask pattern is transferred upon a substrate by photolithographic techniques, and the remainder of the substrate other than the mask pattern is removed, for example, by reactive ion etching (RIE process). In the case of an optical modulator in which an intensity, phase, wavelength or the like of light is modulated, while electrodes are formed to apply a modulating AC electric field to the ridge-shaped optical waveguide portion, it is theoretically known that as the angle of the ridge reaches 90°, the coefficient of correcting the electric field can be increased and the driving voltage can be lowered (JP-A-4 123 018). In JP-A-4 123 018, the coefficient of correcting the electric field was tried to be made as large as possible by setting the ratio d/w of the ridge-shaped optical wavelength at not less than 0.1 but not more than 1.0 and setting the angle of the ridge at 90°±10°.

However, according to the above method, the following problem is still unsolved. That is, reactive ion etching, takes a very long time to uniformly etch the entire wafer having a diameter of, for example, 3 inches down to a depth of a few $\mu$m, which results in costly working. Further, since high energy ions are irradiated upon the substrate, there occur problems that the substrate is likely to be damaged, a working denatured layer is formed at an optical waveguide through which essential light passes, and consequently characteristics such as refractive index changes. Since the formation of such a working denatured layer is not considered in simulating the optical waveguide device, actual characteristics of the optical waveguide device differ from those grasped in the simulation, which result in a cause for deterioration.

Furthermore, there is a limit to improvement upon the electric field correcting coefficient in the case of the above prior art light modulator. That is, an upper surface of the ridge-shaped optical waveguide portion is almost flat, its side faces are inclined, and a film of a modulating electrode is formed over these inclined side faces and a main plane of the epitaxial film. Therefore, as theoretically investigated in a literature OQE 77–57, "Ridge-shaped waveguide portions" published by Corporate Juridical Person: Electronic Communication Academy, Oct. 24, 1997, if the modulating AC electric field is applied to the optical waveguide, the modulating efficiency due to this alternative electric field decreases and the driving voltage is accordingly lower as compared with the ridge angle being 90°.

The reason why the side faces of the ridge-shaped optical waveguide portion are inclined is considered as follows. That is, the ridge-shaped optical waveguide portion is projected at the main plane of the epitaxial film, and at that time surrounding portions of such a ridge-shaped optical waveguide portion need to be etched as deep as possible so as to increase the ratio d/W in which d and W are the height and the width of the ridge-shaped optical waveguide, respectively, namely so as to project the ridge-shaped optical waveguide in a slender form. However, the ratio in the etching speed between the substrate and the mask is ordinarily 2:1 to 5:1. Therefore, in order to deeply etch the surrounding portions around the ridge-shaped optical waveguide, a mask having a correspondingly increased depth needs to be used. However, when such a thick mask is used, the ridge angle 0 decreases far less than 90° because the etching rate decreases around the mask. For example, if the height W of the ridge-shaped optical waveguide is increased to 2 $\mu$m or more, it is difficult to set the ridge angle to near 90°.

SUMMARY OF THE INVENTION

It is an object of the present invention to reduce a working cost by shortening a time period required for the formation of the ridge-shaped optical waveguide portion, decrease any damage upon the substrate during working, and prevent the formation of any working denatured layer in a process for producing an optical waveguide device comprising a substrate and a ridge-shaped optical waveguide portion projecting at a main plane of the substrate. Further, it is anther object of the present invention to approach side faces of the ridge-shaped optical waveguide portion to a vertical direction in such a producing process.

The present invention relates to a process for producing an optical waveguide-provided substrate including a substrate and a ridge-shaped optical waveguide portion projected at a main plane of the substrate, comprising the steps of: forming an optical waveguide providing film on a surface of the substrate, and forming said ridge-shaped optical waveguide portion at the main plane of the substrate by abrasion working, said ridge-shaped optical waveguide portion comprising a ridge portion and an optical waveguide formed on said ridge portion.

According to the optical waveguide device producing process of the present invention, the following embodiments are preferred. (1) A light having a wavelength of not more than 350 nm is used as a light source for the abrasion working. (2) A light having a wavelength in a range of 150 to 300 nm is used as the light source for the abrasion working. (3) An oxide single crystal is used as a material of the substrate. (4) At least one oxide single crystal selected from the group consisting of lithium niobate, lithium tantalate, and a solid solution of lithium niobate and lithium tantalate is used as the oxide single crystal in the above (3). (5) At least one oxide single crystal selected from the group consisting of lithium potassium niobate and lithium potassium tantalate is used as the oxide single crystal in the above (3).

These and other objects, features and advantages of the invention will be well appreciated when taken in conjunction with the attached drawings, with the understanding that some modifications, variations and changes of the same could be easily made by the skilled person in the art to which the invention pertains.

BRIEF DESCRIPTION OF THE DRAWINGS

For a better understanding of the invention, reference is made to the attached drawings, wherein:

FIG. 1 is a perspective view for schematically illustrating the state in which a spot-forming light flux 5 is irradiated upon a main plane 1 $a$ of a substrate in a spot scanning system;

FIG. 2 is a perspective view for schematically illustrating the state in which light fluxes 6 are irradiated upon a main plane 1 $a$ of a substrate in a simultaneous transfer working system;

FIG. 3 is a perspective view for schematically illustrating the state in which a slit shaped light flux 7 is irradiated upon a main plane 1 $a$ of a substrate in a slit-scanning system;

FIGS. 4(a) and 4(b) are front views for schematically showing optical waveguide provided substrates 11A and 11B, respectively which can be produced by the present invention;

Fig. 8 is a plane view showing the spot shape of an excimer laser used in Examples according to the present invention.

DETAILED DESCRIPTION OF THE INVENTION

Figure 5A:
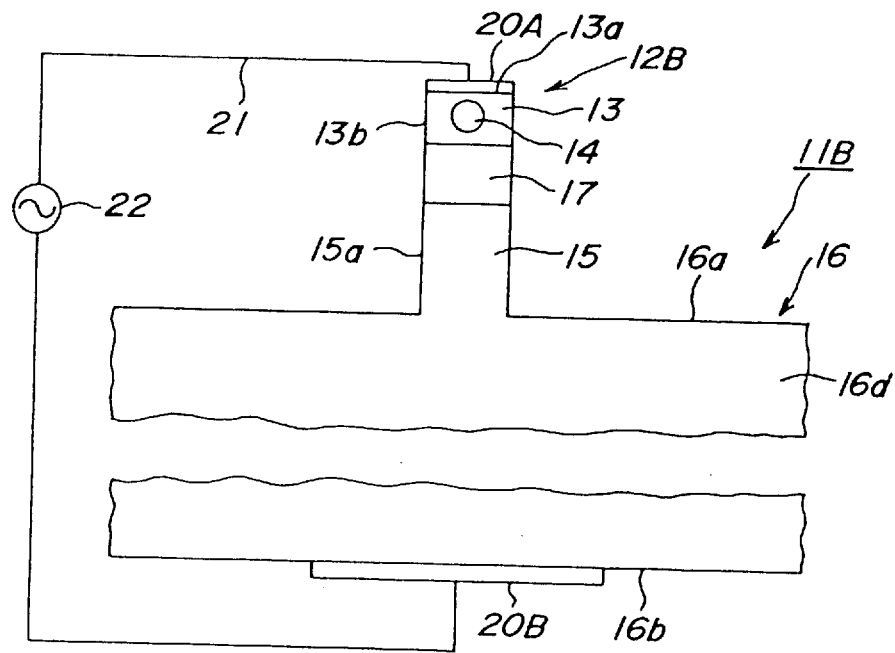
FIGS. 5(a) and 5(b) are front views for schematically showing optical waveguide devices, respectively which can be produced by the present invention.

In the following, the present invention will be explained in detail with reference to the attached drawings.

The present inventors repeatedly made research upon the processes for forming ridge-shaped optical waveguides portion upon substrates made of oxide single crystals. During the research, the inventors reached a technical idea that a ridge-shaped optical waveguide portion is formed on a substrate by directly abrading the substrate by means of an excimer laser.

The "excimer laser" is a laser beam in an ultraviolet range of 150 to 300 nm, and is characterized in that its wavelength can be selectively set depending upon the kind of a gas sealed. The "abrading" is a working method in which a target shape is realized by irradiating a high energy light such as excimer laser upon a material to be worked and instantly decomposing and evaporating that portion of the material upon which the light has been irradiated.

The present inventors examined the use of an abrasion working technique with excimer laser for the formation of the ridge-shape optical waveguide portion. At that time, the inventors also examined an assist etching working technique in liquid, etc.

As a result, it was discovered that the abrasion working with the excimer laser is effective particularly for the formation of the ridge-shaped optical waveguide portions, and can produce such ridge-shaped optical waveguide portions at extremely high productivity. In addition, considerable stability in both the optical characteristics and the shape can be realized for the ridge-shaped optical waveguide portions thus formed.

It was further discovered that when light was transmitted through the optical waveguide of the thus obtained ridge-shaped optical waveguide portion, its light absorbing characteristic and light quenching rate characteristic were good, and that a working denatured layer was not formed at the surface of the optical waveguide. The inventors reached the present invention based on the above discoveries.

In addition, according to the present invention, it is found out that d/W of the ridge-shaped optical waveguide portion or d/W of a ridge portion mentioned later can be made greater than (once to not more than 100 times) that of the conventional one. In particular, for the above mentioned reasons, a slender ridge-shaped optical waveguide portion having d/W being not less than 2 could not be produced by ion etching or the like. Furthermore, it was confirmed that the ridge angle of the optical waveguide portion can be made almost 90°.

The present inventors further examined the reason why the above function and effect were obtained. That is, the reason why the optical characteristics are good is considered that since that portion of the substrate upon which the light is irradiated is instantly decomposed and evaporated according to the abrasion working, that portion of the substrate which light does not directly hit undergoes almost no influence due to heat or stress, and that completely no working denatured layer is formed at a side faces of the ridge-shaped optical waveguide portion. For example, if etching is effected by the RIE process, a working denatured layer having a thickness of a few $\mu$m is formed. Therefore, a ridge-shaped optical waveguide portion needs to be designed preliminarily considering the formation of such working denatured layers at side faces, and stability of the optical characteristics is deteriorated.

With respect to the stability in the shape of the ridge-shaped optical waveguide portion, the ridge-shaped waveguide portion produced by the RIE process had side faces inclined at 70° to 80° with respect to the main plane of the substrate. However, according to the present invention, the inclination of the side faces of the ridge-shaped optical waveguide portion can be accurately controlled with respect to the main plane of the substrate by adjusting the inclination of a lens of a laser beam irradiating device to an optimum value.

As a light source for abrasion working, light having a shorter wavelength side of an absorption edge of a material of the substrate needs to be used. However, the light having a wavelength of not more than 350 nm is ordinarily preferred. In particular, if a substrate made of an oxide single crystal is to be worked, the light irradiated upon the substrate is absorbed in the polarized surface layer with the result that only a surface layer is decomposed, while the interior of the substrate is not decomposed. Since only the surface layer is decomposed and no working damage occurs inside the substrate.

The favorable wavelength in the abrasion working varies depending upon the location of the light absorption edge of the crystal to be worked, and therefore cannot be uniformly specified. In general, however, the oxide single crystals to be used for the optical waveguides have light absorption edges in a wavelength range of not more than 350 nm. Therefore, for example, if an argon laser having a wavelength of 512 nm is used, good abrasion working could not be effected. The reason is that since the wavelength of the argon laser is longer than the light absorption edge of the material of the substrate, the light penetrates into the interior of the oxide single crystal, so that abrasion due to the absorption of the light by the surface is unlikely to occur.

The wavelength for abrasion working is preferably set at not more than 300 nm. However, it is preferably not less than 150 nm from the standpoint of practical applicability. As an actual light source, a YAG fourth harmonic wave (266 nm laser beam), an excimer lamp or the like may be now practically used besides the excimer laser beam source.

As the light irradiator for abrasion working, a so called simultaneous type irradiator and a so called multi-reflective type irradiator were known. The multi-reflective type irradiator is characterized in that a light utilizing percentage is high if the open rate of a mask is large. In the present invention, it is preferable to use an abrasion working device of the multi-reflective type, because this device enables a chip pattern formed all over a wafer having a dimension of not less than 1 inch to be worked in a short time.

Now, the excimer laser will be further explained. The excimer laser is an oscillation laser for repeatedly outputting ultraviolet ray pulses, wherein ultraviolet rays generated from a gaseous compound such as ArF (wavelength: 193 nm), KrF (wavelength: 248 nm) or XeCl (wavelength: 308 nm) are outputted by means of an optical resonator in the state that the ultraviolet rays are arrayed in a given direction. Since the excimer laser is an ultraviolet ray laser having a short wavelength, it can decompose bonds between atoms and/or molecules constituting a material with energy of photons. The application of the excimer laser has been widened based on this chemical reaction.

It is reported that the abrasion working with the excimer laser is used, for example, to bore holes in fine working polyimide or the like so that fine holes having good shapes can be formed. As a literature regarding an applied technique of the excimer laser, "Excimer laser now in a practically applicable stage" in "O plus E" No. 11, pp 64–108, November 1995 may be recited.

In the present invention, the following three embodiments may be recited as processes for forming ridge-shaped optical waveguide portions by the excimer laser. (i) Spot scanning working This is a method schematically illustrated in FIG. 1. In FIG. 1, a spot shaped light flux 5 is irradiated upon a main plane 1a of a substrate 1 such that the optical axis of the laser is vertical to the main plane, and the light flux 5 is advanced, for example, in a direction orthogonal to a side face 1b, i.e., in an arrow A direction. As a result, a channel 2A having a rectangular cross section is formed at a portion of the substrate where the light flux passed. Similarly to this, a channel 2B is formed in parallel to the channel 2A. Broken lines 4 show a location where the channel 2B is to be formed. A slender ridge-shaped optical waveguide portion 3 is formed between the channels 2A and 2B. An upper face 3a of the optical waveguide 3 is in parallel to the main face of the substrate, and a pair of side faces 3b are vertical to the main face of the substrate.

According to this method, a layer of a scattered material heaped during the working can be removed by post etching. Further, since the channel pattern is formed by scanning the spot shaped light flux 5, a ridge-shaped optical waveguide portion having an arbitrary planar shape can deformed. (2) Simultaneous transfer working This is a method schematically shown in FIG. 2. The same portions as shown in FIG. 1 are denoted by the same references numerals, and explanation thereof is omitted. Light fluxes 6 having passed a mask having a given transfer pattern are irradiated directly upon a main face 1a of a substrate 1, so that a ridge-shaped optical waveguide portion having a given plane pattern is formed without moving the light fluxes.

According to this method, since the planar transfer pattern of the mask is simultaneously transferred upon the substrate, the working efficiency is high, and the planar shape of the ridge-shaped optical waveguide portion can be extremely excellently reproduced. However, according to this method, the laser beam having a large sectional area needs to be generated, and high accuracy in the production of the mask through which the laser beams are to be passed as well as high accuracy in the optical system are required. (3) Slit scanning working This is a method schematically shown in FIG. 3. A laser beam flux 7 is obtained by passing a laser beam through a mask having a slender pattern slit. This laser beam flux 7 is irradiated upon a main plane 1a of a substrate 1, and scanned in an arrow B direction. According to this method, the shape of a bottom face of each of channels 2A and 2B thus formed is made particularly smooth. However, in this method, only the channel having a straight shape can be formed, so that only a ridge-shaped optical waveguide portion having a straight shape can be formed. In addition, side faces of the ridge-shaped optical waveguide portion are likely to be unclear.

The ridge-shaped optical waveguide portion obtained by the present invention may be directly projected from the substrate. Alternatively, a ridge portion is formed projecting from the substrate, a base part of the ridge portion being made of an oxide single crystal as that of the substrate, and a ridge-shaped optical waveguide may be formed of an epitaxial film on a top of the ridge portion. By so doing, for the following reason, optical strain in the optical waveguide portion can be diminished, so that loss in the light transmission and loss in joining between an optical fiber can be further reduced, and a light quenching rate can be decreased.

A film capable of forming the optical waveguide may be formed on the surface of the substrate according to the conventional process. Further, an epitaxial film of an oxide single crystal may be formed on the surface of the substrate, and subsequently a film capable of forming the optical waveguide may be formed on the epitaxial film provided surface of the substrate, according to the conventional process.

In the following, embodiments of the optical waveguide provided substrates and devices obtained by this method of the present invention will be explained with reference to FIGS. 4 through 7. In an optical waveguide provided substrate 11A of FIG. 4(a), a ridge-shaped optical waveguide portion 12A is formed projecting from a main plane 16a of a substrate 16. A reference numeral 16b denotes another main plane, and 16d a side face. A ridge portion 15 of the ridge shaped optical waveguide portion 12A is made of the same material as an oxide single crystal as the material of the substrate 16. An optical waveguide 13 is formed of an epitaxial film on the ridge portion 15. In this embodiment, since the epitaxial film is used as an optical waveguide, the refractive index of the epitaxial film needs to be greater than that of the substrate 16.

In an optical waveguide substrate 11B of FIG. 4(b), a ridge shaped optical waveguide portion 12B is formed projecting from a main plane 16 a of a substrate 16. A ridge portion 15 of the ridge shaped optical waveguide portion 12B is made of the same oxide single crystal as that of the substrate 16. An epitaxial film 17 and an optical waveguide 13 are formed on the ridge portion 15. The refractive index of the optical waveguide 13 is greater than that of the ridge portion 15.

When the above ridge shaped optical waveguide portions 12A, 12B are formed by abrasion working, the optical waveguide portion or the ridge portion having the ratio of d/W being not less than 1 or particularly not less than 2 in which d and W are the depth and the width of each of the ridge shaped optical waveguide portions, respectively, as well as the angle of the ridge of about 90° can be formed. The angle of the ridge (ridge angle) means an angle defined between the upper face of the optical waveguide or the ridge shaped optical waveguide portion and the side face thereof.

In the above optical waveguide provided substrates, the sectional shape of a light beam 14 transmitting in the optical waveguide 13 is almost circular, so that the light beam is not strained. This is because that since the ridge portion 15 of the ridge shaped optical waveguide portion is projected from the substrate 16 and the optical waveguide 13 is formed on the ridge portion 15, the light beam does not leak or diffuse into the substrate 16. Furthermore, since the side faces 13b of the optical waveguide 13 are parallel to each other and the optical waveguide 13 has a square or rectangular sectional shape, symmetry of the light beam 14 is high, and the light beam transmitting efficiency is the maximum.

Figure 5B:
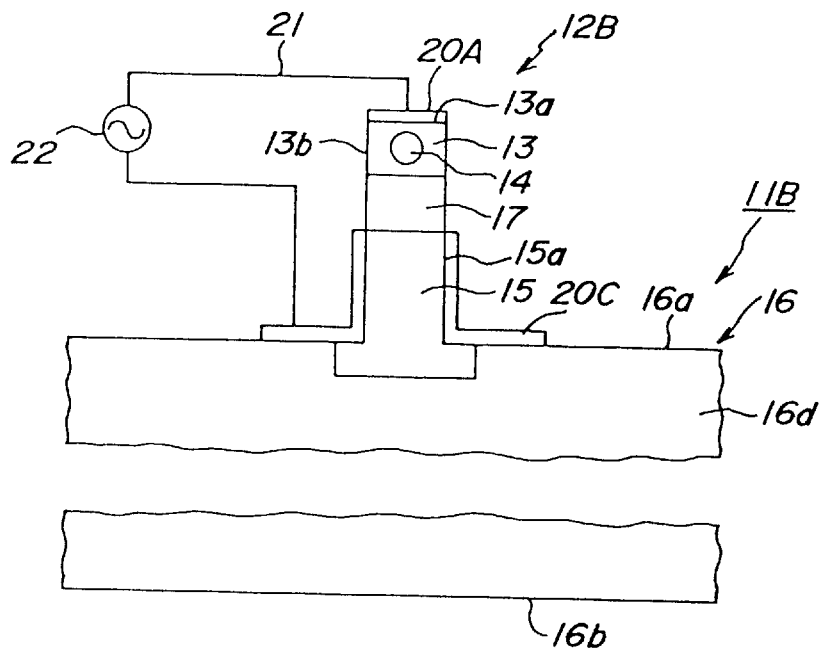
Figure 6:
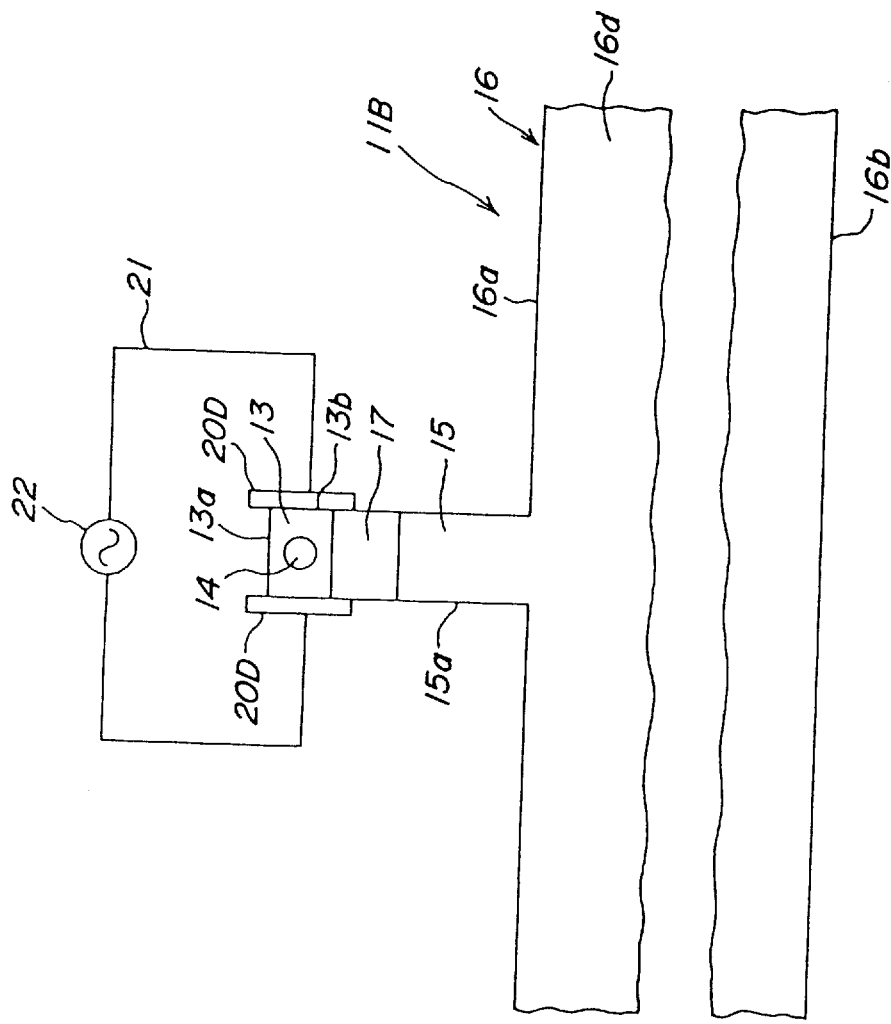
FIG. 6 is a front view for schematically showing an optical waveguide device which can be produced by the present invention.

An optical modulator and an optical switch element for modulating the intensity and the phase of the light can be produced by using such optical waveguides. In this case, although the configuration of light modulating electrodes is not particularly limited, electrodes having configurations as shown in FIGS. 5(a), 5(b), and 6 are preferably formed. In the optical waveguide device of FIG. 5(a), electrode 20A is formed on a top face or an upper face 13a of an optical waveguide 13, and another electrode 20B is formed on another main plane or a bottom face 16b of the substrate 16 and opposed to the electrode 20A. A pair of these electrodes 20A and 20B are electrically connected to an electric power source (preferably AC power source) via a wire 21. Thereby, voltage is applied to the ridge portion 12B in parallel to a length direction (height direction) so that electric field may be applied to the optical waveguide 13.

In the optical waveguide device, an electrode 20A is formed on a top face 13a of an optical waveguide 13 of an optical waveguide provided substrate 11B, while an electrode 20C is formed extending upon a surface 15a of a ridge portion 15 of a ridge shaped optical waveguide portion 12B and a main plane 16a of a substrate 16. A pair of the electrodes 20A and 20C are electrically connected to an electric power supply means 22 via a wire 21. By so doing, voltage is applied to the optical waveguide 13 in a height direction thereof.

In the optical waveguide device of FIG. 6, electrodes 20D are formed on a pair of those side faces 13b of an optical waveguide 13 of a ridge portion 12B, respectively, which are vertical to a main plane 16a of a substrate 16, and the electrodes 20D are electrically connected to an electric power supply means 22 via a wire 21. By so doing, voltage is applied to the optical waveguide 13 by the electrodes 20D.

Needless to say, optical waveguide devices as shown in FIGS. 5(a), 5(b) and 6 can be produced even by using the optical waveguide provided substrate 11A in FIG. 4(a). As matter of course, in embodiments corresponding to FIGS. 5(a) and 5(b), an electrode 20A is formed on the top face 13a of the optical waveguide 13, whereas in an embodiment corresponding to FIG. 6, electrodes 20D are formed on a pair of side faces of the optical waveguide 13, respectively.

Figure 7:
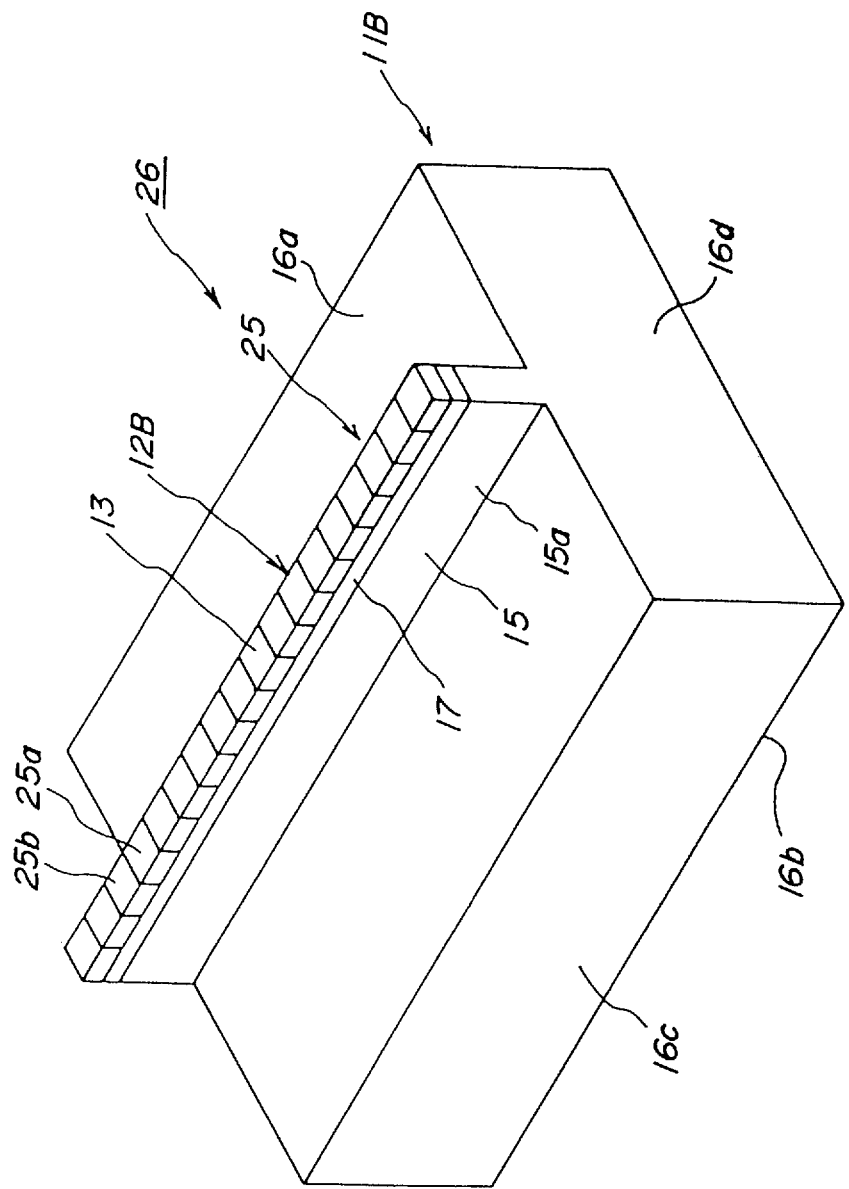
FIG. 7 is a perspective view for schematically illustrating a quasi-phase matched second harmonic generation device having a periodically reversibly polarized structure which device can be produced by the present invention.

FIG. 7 is a perspective view for illustrating an embodiment in which the optical waveguide provided substrate according to the present invention is applied to a second harmonic generation device having a periodically polarization reversed structure quasi phase matched. This second harmonic generation device 26 includes an optical waveguide substrate 11B. In the optical waveguide 13, the periodically polarization reversed structure is formed. That is, as schematically shown in FIG. 7, a number of polarization reversed portions 25a and 25b are formed such that the polarity is reversed between the adjacent polarity reversed portions 25a and 25b.

In order to produce the second harmonic generation device 26, a substrate 16 is polarized in a given direction, preferably in a direction vertical to a main plane 16a of the substrate 16, an epitaxial film is then formed on the substrate 16, and a given portion of the epitaxial film and the substrate 16 are subjected to the abrasion working as mentioned above. At that time, the polarized direction of the epitaxial film is reversed to that of the substrate 16. Next, the periodically polarization reversed structure is formed in the optical waveguide according to a known process.

As an oxide single crystal to be abrasion worked in the present invention, lithium niobate, lithium tantalate, lithium niobate lithium tantalate solid solution, lithium potassium niobate, and potassium tantalate may be recited.

Although the sectional shape of the optical waveguide portion is not limited to any particular one, almost a square sectional shape is preferred in order to improve symmetry of the light beam and decrease loss in the light transmission to the maximum. The ratio of d/W of the ridge shaped optical wavelength portion is preferably not less than 2, because an electric field applied to the optical waveguide of the ridge portion is unlikely to expand into the substrate in this case. Further, if the ratio of d/W is not more than 100, it is more easy to handle the optical waveguide provided substrate having the ridge portion, so that the ridge portion is unlikely to be damaged during handling of the substrate. Example 1

A Z-cut 3-inch wafer composed of an $LiNbO_3$ single crystal substrate (optical grade) was prepared, which had a diameter of 3 inches and a thickness of 1 mm. On this. substrate was formed a single crystal film of lithium niobate lithium tantalate by the liquid phase epitaxial method. More specifically, a quasi ternary melt of $LiNbO_3LiTaO_3LiVO_3$ was prepared. The preparatory composition of this melt was $LiNbO_3:LiTaO_3:LiVO_3=4:16:80$. The melt was stirred at 1200° C for not less than 3 hours to obtain a sufficiently uuniform liquid phase. Thereafter, the melt was cooled down to 950° C, and held there for not less than 12 hours. As a result, nuclei of the solid solution in an amount corresponding to an oversaturated one came out and a solid phase was deposited upon the wall surface of a crucible.

Then, the melt was cooled from 950° C to a film forming temperature of 940° C. Immediately after that, the lithium niobate single crystal substrate was contacted with the liquid phase portion, thereby forming a film thereon. The resulting solid solution film had a composition of $LiNb_{0.7}Ta_{0.30}O_3$. The thickness of the film was 10 μm.

A film of lithium niobate was formed on this solid solution film according to the liquid phase epitaxial process. More specifically, a quasi binary melt of $LiNbO_3LiVO_3$ was prepared. The preparatory composition of this melt was $LiNbO_3:LiVO_3=20:80$. The melt was stirred at 1200° C for not less than 3 hours to obtain a sufficiently uniform liquid phase. Thereafter, the melt was cooled down. to 905° C, and held there for not less than 12 hours.

Then, the melt was cooled from 905° C to a film forming temperature of 900° C. Immediately after that, the lithium niobate single crystal substrate was contacted with the liquid phase portion, thereby forming a film thereon. The thickness of the film of the resulting lithium niobate single crystal was 10 μm.

The substrate at that side upon which the epitaxial films were formed was subjected to the abrasion working, which was effected according to the method shown in FIG. 1 by using a KrF excimer laser (wavelength: 248 nm) having a wavelength smaller than an absorption end of the lithium niobate single crystal as a light source. A planar shape of light fluxes irradiated is shown in FIG. 8. In FIG. 8, a reference numeral 8 denotes irradiated portions or spots, and 9 a gap between two irradiated spots. The width "a" was 200 $\mu$m, the gap "b" was 10 $\mu$m, and the longitudinal length C was 1.0 mm. The optical system was adjusted to give an irradiated energy density of 6 J/Cm². The pulse width was 15 nsec., the pulse frequency was 600 Hz, and the scanning speed was 1.2 mm/sec. A time required to form a ridge shaped optical waveguide portion having a length of 20 mm was 17 second.

The observation of the sectional shape of the thus produced ridge shaped optical waveguide portion with a scanning type electron microscope revealed that two channels each had a depth of 20 $\mu$m and a width of 10 $\mu$m, and an inclination angle of each side face of the optical waveguide portion was 88° to 90° relative to a main plane of the substrate. The light transmitting characteristic of this optical waveguide provided substrate was examined by introducing TE waves having a wavelength of 1.55 $\mu$m.

As a result, the transmitted light was of a single mode with a transmission loss of 0.6 dB/cm. (Example 2)

A KLN epitaxial film (composition: $K_{3.0}Li_{2.2}Nb_{4.8}O_{12}$) was formed in a thickness of 5.0 $\mu$m on a Z-cut KLiNT single crystal substrate (composition: $K_{3.0}Li_{2.2}Nb_{4.6}Ta_{0.2}O_{12}$) having a dimension of 30 mm×30 mm according to the liquid phase epitaxial method. The substrate at that side upon which the epitaxial film was formed was subjected to the abrasion working, which was effected according to the method shown in FIG. 1 by using a ArF excimer laser (wavelength: 193 nm) having a wavelength smaller than an absorption end of the KLINT single crystal as a light source. A planar shape of light fluxes irradiated is shown in FIG. 8. In Example 2, the width "a" was 200 $\mu$m, the gap "b" was 5 $\mu$m, and the longitudinal length C was 1.0 mm. The optical system was adjusted to give an irradiated energy density of 6 J/cm². The pulse width was 15 nsec., the pulse frequency was 300 Hz, and the scanning speed was 1.2 mm/sec. A time required to form a ridge shaped optical waveguide portion having a length of 7 mm was 6 second.

The observation of the sectional shape of the thus produced ridge shaped optical waveguide portion with the scanning type electron microscope revealed that two channels each had a depth of 8 $\mu$m and a width of 5 $\mu$m, and an inclination angle of each side face of the optical waveguide portion was 90° relative to a main plane of the substrate. The light transmitting characteristic of this optical waveguide provided substrate was examined by introducing TE waves having a wavelength of 0.85 $\mu$m. As a result, the transmitted light was of a single mode with a transmission loss of 0.3 dB/cm. (Comparative Example 1)

Similarly to Example 1, a film of lithium niobate lithium tantalate solid solution and a film of lithium niobate were successively formed on a substrate in this order. A mask was formed from a titanium film having a width of 10 $\mu$m and a thickness of 400 Å according to the lift off method. The substrate was subjected to reactive ion etching with $C_3F_6$ gas through the mask, thereby forming a ridge shaped optical waveguide having a width of 10 $\mu$m and a depth of 20 mm. The pressure of the gas was set at 0.01 Torr, and the etching speed was 40 nm/min.

The observation of the sectional shape of the thus produced ridge shaped optical waveguide portion with the scanning type electron microscope revealed that the ridge shaped optical waveguide portion had a trapezoidal section, and an inclination angle of each side face of the optical waveguide portion was 60° to 70° relative to a main plane of the substrate. The width of the upper face of the optical waveguide portion was 10 $\mu$m, and that of the bottom was 22 $\mu$m. The light transmitting characteristic of this optical waveguide provided substrate was examined by introducing TE waves having a wavelength of 1.55 $\mu$m. As a result, the transmitted light was of a multiple mode with a transmission loss of 1.9 dB/cm.

As mentioned above, according to the present invention, the ridge shaped optical waveguide portions can be produced at extremely high productivity, and remarkable stability in both optical characteristics and shape can be realized for the resulting ridge shaped optical waveguide portions. When light is transmitted through the thus obtained ridge shaped optical waveguide, the light absorbing characteristics and the light quenching ratio characteristics are excellent, and no working denatured layer is formed at the surface of the optical waveguide. In addition, the angle of the side faces of the ridge shaped optical waveguide portion relative to the main plane of the substrate can be arbitrarily controlled, particularly to 90°.

What is claimed is:

1. A process for producing an optical waveguide provided substrate including an oxide single crystal substrate and a ridge shaped optical waveguide portion projected at a main plane of the substrate, comprising the steps of: forming an oxide single crystal optical waveguide providing film on a surface of the substrate, and forming said ridge shaped optical waveguide portion at the main plane of the substrate by abrasion working using a light source that projects light having a wavelength of not more than 350 nm, said ridge shaped optical waveguide portion comprising a ridge portion and an optical waveguide formed on said ridge portion.

2. The process set forth in claim 1, wherein the light has a wavelength in a range of 150 to 300 nm.

3. The process set forth in claim 2, wherein said oxide single crystal is at least one oxide single crystal selected from the group consisting of lithium niobate, lithium tantalate, and a solid solution of lithium niobate and lithium tantalate.

4. The process set forth in claim 2, wherein said oxide single crystal is at least one oxide single crystal selected from the group consisting of lithium potassium niobate and lithium potassium tantalate.

5. The process set forth in claim 2, further comprising the step of forming an epitaxial film of an oxide single crystal on the substrate, and said optical waveguide providing film is formed on the epitaxial film, whereby a part of the epitaxial film is laid between the ridge portion and the optical waveguide.

6. The process set forth in claim 1, wherein said oxide single crystal is at least one oxide single crystal selected from the group consisting of lithium niobate, lithium tantalate, and a solid solution of lithium niobate and lithium tantalate.

7. The process set forth in claim 6, further comprising the step of forming an epitaxial film of an oxide single crystal on the substrate, and said optical waveguide-providing film is formed on the epitaxial film, whereby a part of the epitaxial film is laid between the ridge portion and the optical waveguide.

8. The process set forth in claim 1, wherein said oxide single crystal is at least one oxide single potassium niobate and lithium potassium tantalate.

9. The process set forth in claim 8, further comprising the step of forming an epitaxial film of an oxide single crystal on the substrate, and said optical waveguide providing film is formed on the epitaxial film, whereby a part of the epitaxial film is laid between the ridge portion and the optical waveguide.

10. The process set forth in claim 1, further comprising the step of forming an epitaxial film of an oxide single crystal on the substrate, and said optical waveguide providing film is formed on the epitaxial film, whereby a part of the epitaxial film is laid between the ridge portion and the optical waveguide.

* * * * *